(12) United States Patent
Ogino et al.

(10) Patent No.: US 12,548,840 B2
(45) Date of Patent: Feb. 10, 2026

(54) ELECTRIC POWER STORAGE MODULE

(71) Applicant: Panasonic Intellectual Property Management Co., Ltd., Osaka (JP)

(72) Inventors: Hirotaka Ogino, Osaka (JP); Shota Norimine, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 512 days.

(21) Appl. No.: 18/249,403

(22) PCT Filed: Oct. 21, 2021

(86) PCT No.: PCT/JP2021/038856
§ 371 (c)(1),
(2) Date: Apr. 18, 2023

(87) PCT Pub. No.: WO2022/091919
PCT Pub. Date: May 5, 2022

(65) Prior Publication Data
US 2023/0395920 A1 Dec. 7, 2023

(30) Foreign Application Priority Data

Oct. 30, 2020 (JP) .................................. 2020-182503

(51) Int. Cl.
*H01M 50/24* (2021.01)
*H01M 50/213* (2021.01)
*H01M 50/244* (2021.01)

(52) U.S. Cl.
CPC ....... *H01M 50/244* (2021.01); *H01M 50/213* (2021.01)

(58) Field of Classification Search
CPC ............. H01M 50/244; H01M 50/213; H01M 50/247; H01M 50/262; H01M 50/264;
(Continued)

(56) References Cited

U.S. PATENT DOCUMENTS 6,333,091 B1 * 12/2001 Kasugai ............. H01M 50/213
429/96
2019/0363318 A1 * 11/2019 Okutani ............. H01M 50/107
2022/0109132 A1 * 4/2022 Cournoyer ............ H01M 10/61

FOREIGN PATENT DOCUMENTS

JP 2014-170613 9/2014

OTHER PUBLICATIONS

International Search Report of PCT application No. PCT/JP2021/038856 dated Jan. 11, 2022.

* cited by examiner

*Primary Examiner* — Raymond Alejandro
(74) *Attorney, Agent, or Firm* — Rimon P.C.

(57) ABSTRACT

An electric power storage module includes an electric power storage device and a holder. The electric power storage device includes a plurality of electrode assemblies that have a cylindrical shape, and a film exterior body that includes a plurality of containers that individually wrap the plurality of electrode assemblies and a sealing part that seals the containers and connects the plurality of containers to each other. The holder includes a side plate extending in an arrangement direction. The side plate includes a plurality of recesses arranged in the arrangement direction and into which the containers are fitted, a first edge and a second edge arranged in an axial direction and extending in the arrangement direction, and a third edge and a fourth edge arranged in the arrangement direction and extending in the axial direction. In addition, the holder includes a first wall plate that is formed by a part of a member forming the side plate and protrudes in an orthogonal direction from at least a part of a region of the first edge.

11 Claims, 9 Drawing Sheets

(58) Field of Classification Search
CPC . H01M 50/269; H01M 50/207; H01M 50/209
See application file for complete search history.

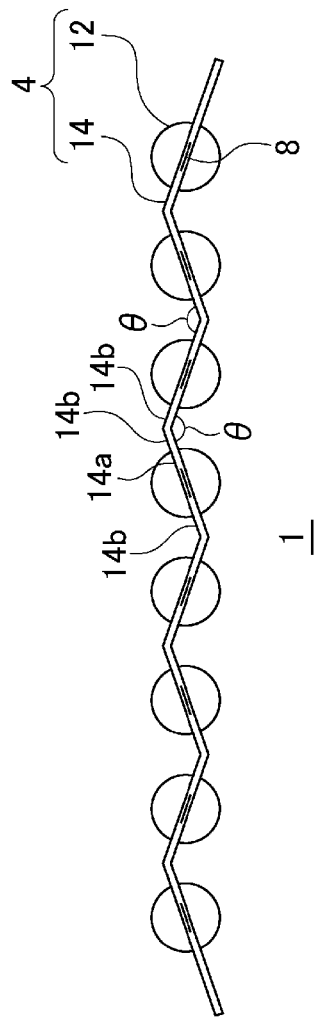
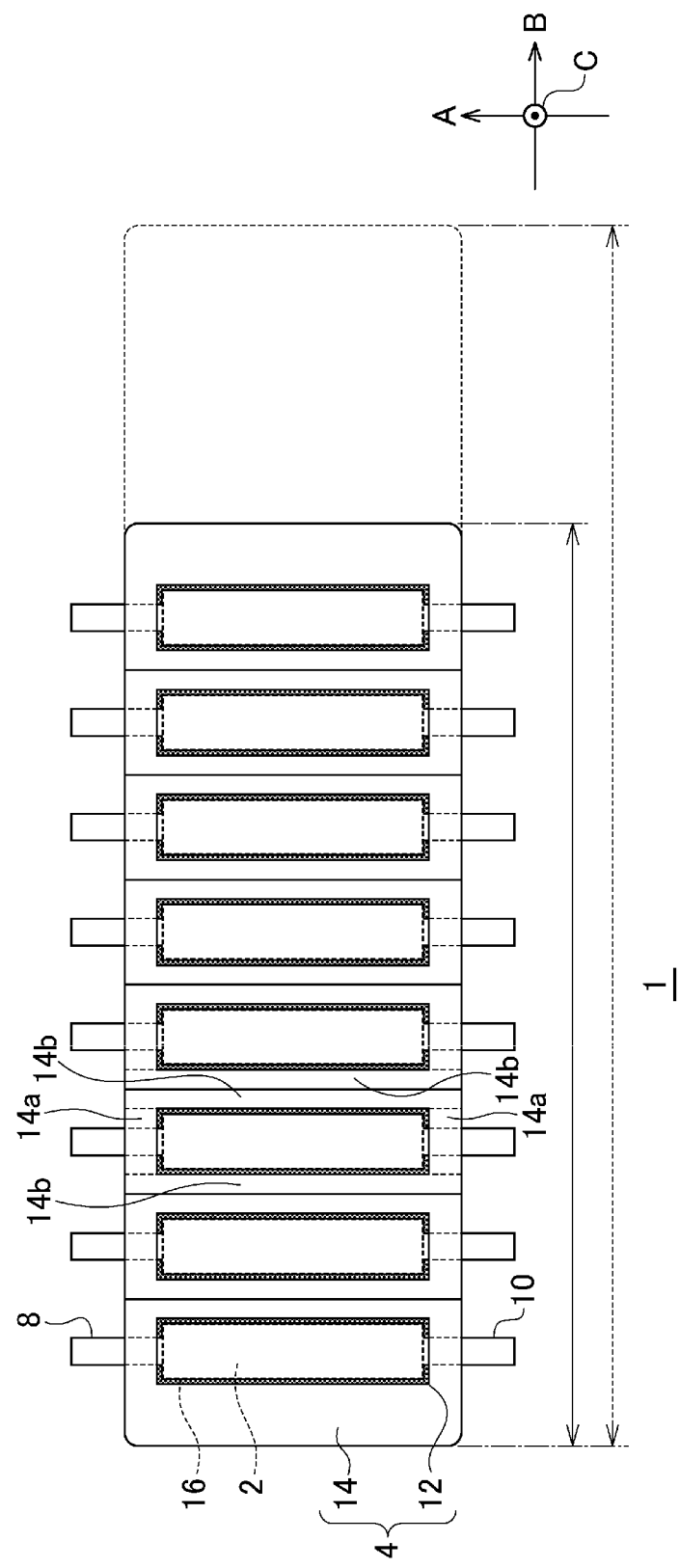

ELECTRIC POWER STORAGE MODULE

CROSS-REFERENCE TO RELATED APPLICATIONS

This application is a U.S. national stage application of the PCT International Application No. PCT/JP2021/038856 filed on Oct. 21, 2021, which claims the benefit of foreign priority of Japanese patent application No. 2020-182503 filed on Oct. 30, 2020, the contents all of which are incorporated herein by reference.

TECHNICAL FIELD

The present disclosure relates to an electric power storage module.

BACKGROUND ART

In the related art, an electric power storage module on which a plurality of cylindrical electric power storage devices (for example, batteries) are mounted has been known (see, for example, PTL 1). In the electric power storage module disclosed in PTL 1, each electric power storage device includes a cylindrical outer covering can, and a wound electrode assembly is contained in each outer covering can.

CITATION LIST

Patent Literature

PTL 1: Unexamined Japanese Patent Publication No. 2014-170613

SUMMARY OF THE INVENTION

The electric power storage module may be used as a power source for a vehicle or a mobile terminal. Thus, it is desired to reduce a weight of the electric power storage module. As a method for reducing the weight of the electric power storage module, it is considered that a plurality of electrode assemblies are wrapped with a common film exterior body while individual sealing properties are maintained. Accordingly, the electric power storage device having a plurality of electrode assemblies is obtained. In this case, since the outer covering can that contains the electrode assemblies can be eliminated, the weight of the electric power storage module can be reduced. On the other hand, the electric power storage device having a structure in which the plurality of electrode assemblies are sealed with the film exterior body is likely to be greatly deformed by an impact or the like due to high flexibility of the film exterior body. Thus, it is desired to enhance holding strength of the electric power storage device.

The present disclosure has been made in view of such a situation, and an object of the present disclosure is to provide a technique for enhancing the holding strength of the electric power storage device having the structure in which the plurality of electrode assemblies are sealed with the film exterior body.

An aspect of the present disclosure is an electric power storage module. The electric power storage module includes an electric power storage device, and a holder that holds the electric power storage device. The electric power storage device includes a plurality of electrode assemblies that have a cylindrical shape, and a film exterior body that includes a plurality of containers that individually wrap the plurality of electrode assemblies and a sealing part that seals the containers and connects the plurality of containers to each other. The holder includes a side plate extending in an arrangement direction of the plurality of electrode assemblies, the side plate including a plurality of recesses arranged in the arrangement direction and into which the containers are fitted, a first edge and a second edge arranged in an axial direction of the electrode assemblies and extending in the arrangement direction, and a third edge and a fourth edge arranged in the arrangement direction and extending in the axial direction; and a first wall plate formed by a part of a member forming the side plate and protruding in an orthogonal direction orthogonal to the axial direction and the arrangement direction from at least a part of a region of the first edge.

Any combination of the above constituent elements and modifications of what is described in the present disclosure in terms of method, device, system, and the like are also effective as aspects of the present disclosure.

According to the present disclosure, the holding strength of the electric power storage device having the structure in which the plurality of electrode assemblies are sealed with the film exterior body can be enhanced.

BRIEF DESCRIPTION OF THE DRAWINGS

FIG. 2A is a schematic view of the electric power storage device as viewed in an axial direction. FIG. 2B is a schematic view of the electric power storage device as viewed in an orthogonal direction.

DESCRIPTION OF EMBODIMENT

Figure 1:
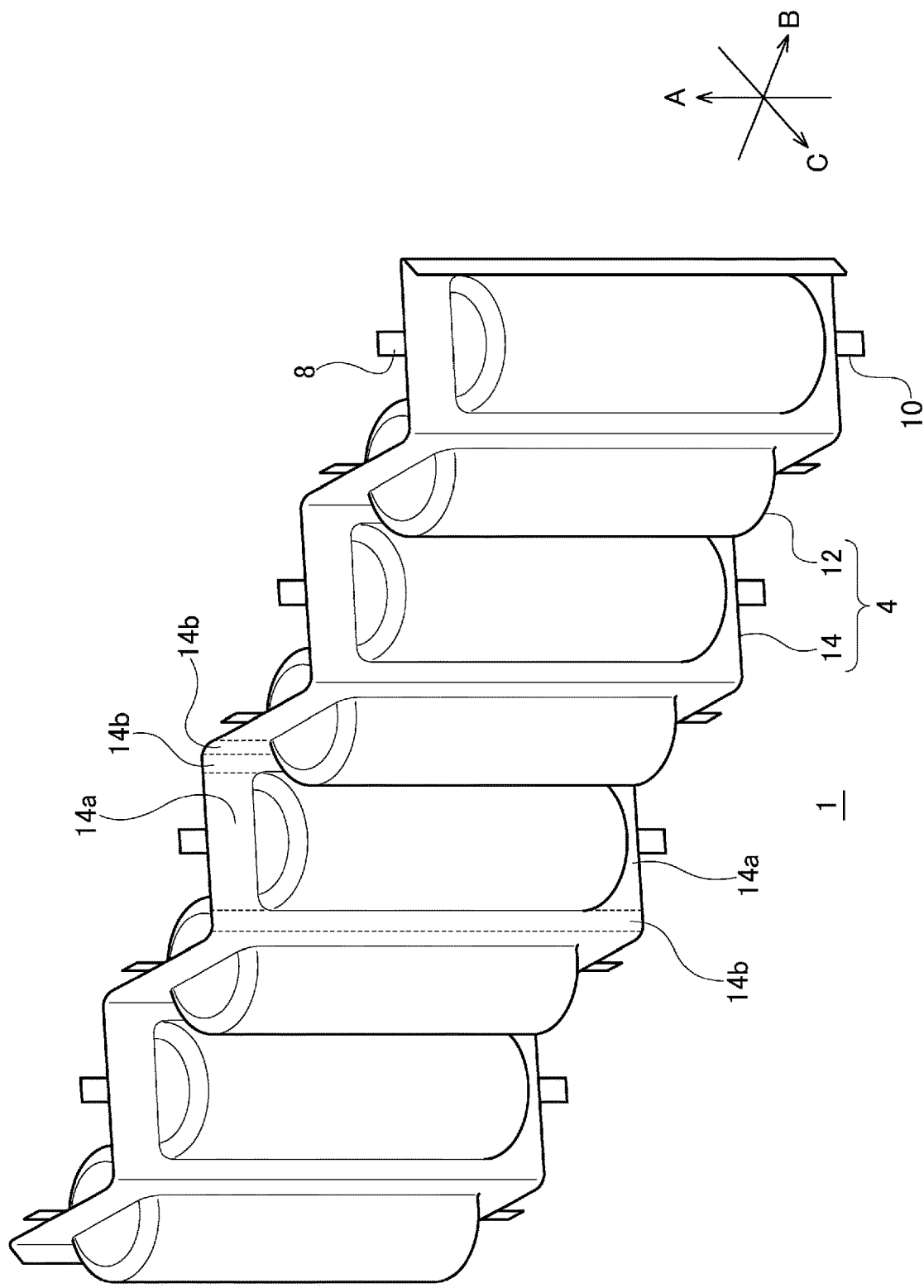
FIG. 1 is a perspective view of an electric power storage device provided in an electric power storage module according to an exemplary embodiment.

Hereinafter, the present disclosure will be described on the basis of preferred exemplary embodiments with reference to the drawings. The exemplary embodiments are not intended to limit the present disclosure but are illustrative, and all features described in the exemplary embodiments and combinations of the features are not necessarily essential to the present disclosure. The identical or equivalent constituent elements, members, and treatments illustrated in the drawings are denoted by the identical reference marks, and a redundant description will be omitted as appropriate. The scale and the shape of each section illustrated in each drawing are set for the sake of convenience in order to facilitate the understanding of the description and should not be interpreted in a limited manner unless otherwise specified. In cases where terms such as "first" and "second" are used in the present description or claims, these terms do not represent any order or importance but are intended to distinguish one configuration from another configuration, unless otherwise specified. From each of the drawings, a part of members not important for describing the exemplary embodiments are omitted.

FIG. 1 is a perspective view of electric power storage device 1 provided in electric power storage module 100 according to the exemplary embodiment. FIG. 2A is a schematic view of electric power storage device 1 as viewed in axial direction A. FIG. 2B is a schematic view of electric power storage device 1 as viewed in orthogonal direction C. In FIG. 2B, an inside of film exterior body 4 is also illustrated for the sake of convenience in description. A state before film exterior body 4 is folded is illustrated by a broken line. In the present exemplary embodiment, a direction in which a spiral axis (central axis of a cylinder) of electrode assembly 2 extends is defined as axial direction A, an arrangement direction of the plurality of electrode assemblies 2 is defined as arrangement direction B, and a direction orthogonal to axial direction A and arrangement direction B is defined as orthogonal direction C.

Electric power storage device 1 of the present exemplary embodiment is, for example, a rechargeable secondary battery such as a lithium ion battery, a nickel-hydrogen battery, or a nickel-cadmium battery, or a capacitor such as an electric double layer capacitor. Electric power storage device 1 includes the plurality of electrode assemblies 2 and film exterior body 4. Although electric power storage device 1 of the present exemplary embodiment includes eight electrode assemblies 2, the number of electrode assemblies 2 is not particularly limited and may be two or more.

Each electrode assembly 2 has a cylindrical shape, and has a wound structure in which a strip-shaped first electrode plate and a strip-shaped second electrode plate are stacked with an inter-electrode separator interposed therebetween and are spirally wound. As an example, the first electrode plate is a negative-electrode plate, and the second electrode plate is a positive-electrode plate. First electrode lead 8 is electrically connected to the first electrode plate. Second electrode lead 10 is electrically connected to the second electrode plate. For example, first electrode lead 8 and second electrode lead 10 have a strip shape (a rectangular shape elongated in one direction), and one end of each is welded to a respective electrode plate. Orientations of the plurality of electrode assemblies 2 are determined such that axial directions A of electrode assemblies 2 are parallel to each other, and the plurality of electrode assemblies 2 are arranged in arrangement direction B at predetermined intervals. The plurality of electrode assemblies 2 are wrapped in common film exterior body 4.

Film exterior body 4 has, for example, a structure in which two laminate films are stacked. Each laminate film has a structure in which thermoplastic resin sheets are stacked on both surfaces of a metal sheet such as aluminum. Film exterior body 4 includes a plurality of containers 12 and sealing part 14. The plurality of containers 12 are arranged in arrangement direction B at predetermined intervals. Each container 12 has a cylindrical shape, and individually encloses and contains each electrode assembly 2. Each container 12 is formed of a bag provided in film exterior body 4. The bag is a portion between the two laminated films where the two laminated films are separated from each other. Accordingly, each container 12 protrudes from sealing part 14 along a shape of a side surface of electrode assembly 2. Each container 12 contains electrolytic solution 16 together with electrode assembly 2.

Sealing part 14 surrounds an outer periphery of each container 12 to seal each container 12. Sealing part 14 is formed of, for example, a welded portion of the thermoplastic resin sheets. The welded portion is obtained by applying a thermocompression bonding treatment to an outer periphery of the bag of film exterior body 4 and welding the thermoplastic resin sheets of the two laminate films to each other. Sealing part 14 seals containers 12 and connects the plurality of containers 12 to each other.

Ends of first electrode lead 8 and second electrode lead 10 on a side opposite to a side connected to electrode assembly 2 project toward an outside of film exterior body 4. An interface between each electrode lead and film exterior body 4 is sealed with a known sealant. In the present exemplary embodiment, first electrode lead 8 and second electrode lead 10 connected to each electrode assembly 2 project opposite to each other in axial direction A. First electrode leads 8 project toward the same side.

Film exterior body 4 is refracted or curved between adjacent containers 12 and meanders in arrangement direction B. That is, film exterior body 4, more specifically, sealing part 14 extends approximately in a zigzag manner as viewed in axial direction A. Film exterior body 4 is folded in a zigzag manner, and thus, an interval between containers 12 in arrangement direction B can be narrowed compared to a state before the film exterior body is folded. Accordingly, a length of electric power storage device 1 in arrangement direction B can be shortened.

The plurality of containers 12 of the present exemplary embodiment are disposed such that centers thereof are disposed on the same straight line as viewed from axial direction A in a state where film exterior body 4 meanders. Accordingly, it is possible to suppress an increase in dimension of electric power storage device 1 in orthogonal direction C as compared with a case where the plurality of containers 12 are disposed such that the centers thereof are shifted in orthogonal direction C. Sealing part 14 bent in a zigzag shape is more inwardly settled than container 12 in orthogonal direction C. Accordingly, it is possible to suppress an increase in dimension of electric power storage device 1 in orthogonal direction C caused by folding of film exterior body 4. In the present disclosure, the centers of the plurality of containers 12 are not necessarily positioned on the same straight line.

Sealing part 14 includes a pair of first portions 14a and a pair of second portions 14b surrounding the periphery of each container 12. The pair of first portions 14a is arranged in axial direction A with each container 12 interposed therebetween, and seals an end of each container 12 in axial direction A. First portions 14a of the present exemplary embodiment extend linearly through the center of container 12 as viewed in axial direction A. The pair of second portions 14b is arranged in a direction orthogonal to axial direction A with each container 12 interposed therebetween, and extends in axial direction A to connect the pair of first portions 14a.

Two second portions 14b positioned between two adjacent containers 12 are connected to each other at predetermined angle lang=EN-US>θ, that is, non-linearly. Directions in which connection parts of two second portions 14b are bent are alternately different in a plurality of connection parts arranged in arrangement direction B. As a result, film exterior body 4 extends in a zigzag manner in arrangement direction B. Further, two second portions 14b each may be bent in a wavy shape.

Hereinafter, an example of a method for manufacturing electric power storage device 1 will be described. FIG. 3A to FIG. 3C and FIG. 4A to FIG. 4C are step diagrams of a method for manufacturing electric power storage device 1.

Figure 3A:
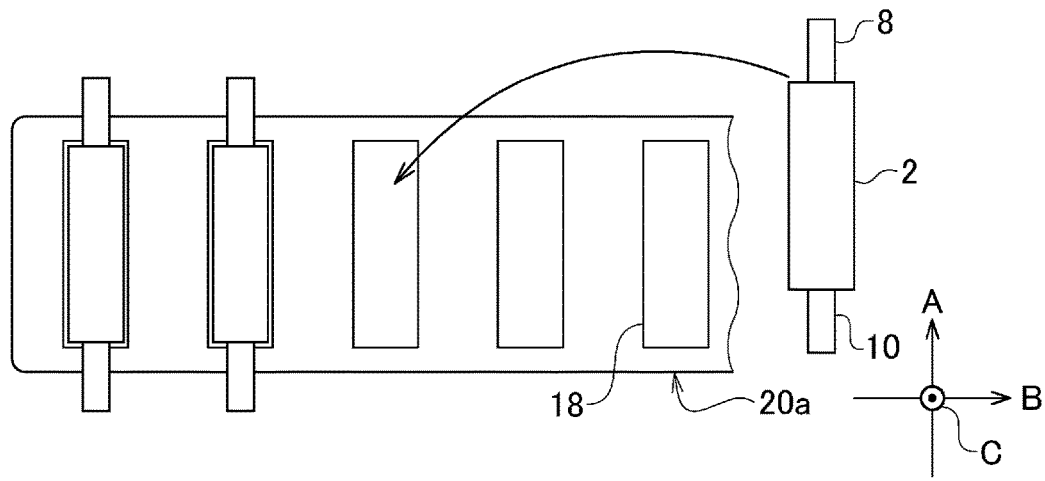
FIG. 3A to FIG. 3C are step diagrams of a method for manufacturing the electric power storage device.

First, as illustrated in FIG. 3A, first laminate film 20a is prepared. A plurality of depressions 18 having a semi-circular columnar shape are formed in advance in first laminate film 20a. The plurality of depressions 18 are formed, for example, by applying a known treatment such as press working to first laminate film 20a. Electrode assembly 2 is mounted in each depression 18. First electrode lead 8 and second electrode lead 10 are connected to electrode assembly 2 in advance. A sealant (not illustrated) is provided in first electrode lead 8 and second electrode lead 10.

Figure 3B:
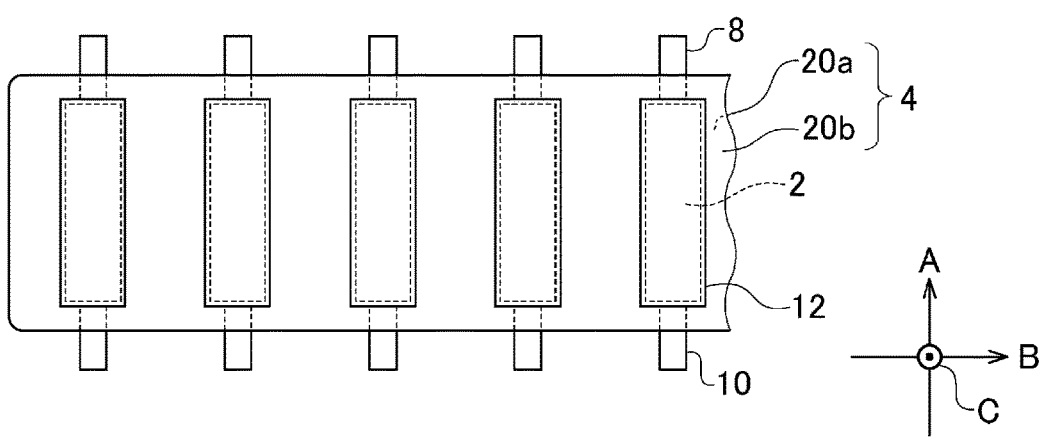

Subsequently, as illustrated in FIG. 3B, second laminate film 20b is overlapped on first laminate film 20a to form film exterior body 4. Depression 18 having a semi-circular columnar shape is provided in second laminate film 20b at a position facing each depression 18 of first laminate film 20a. Thus, first laminate film 20a and second laminate film 20b are overlapped with each other, and thus, the bag, in other words, container 12 is formed by a pair of depressions 18. A method for forming depression 18 in second laminate film 20b is the same as the method for forming depression 18 in first laminate film 20a. In a state where electrode assembly 2 has been contained in container 12, a distal end of first electrode lead 8 and a distal end of second electrode lead 10 project toward an outside of film exterior body 4.

Figure 3C:
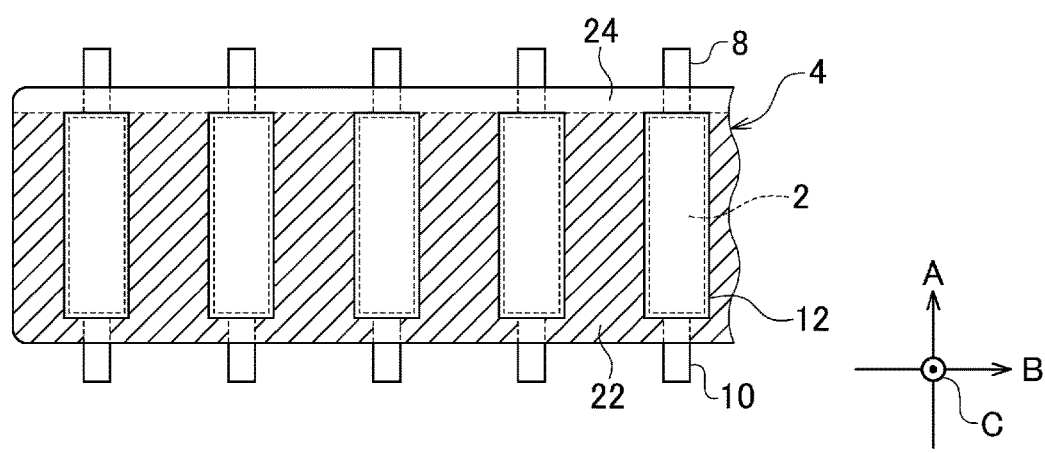

Subsequently, as illustrated in FIG. 3C, a thermocompression bonding treatment is applied to a part of film exterior body 4 to form welded portion 22. A part of film exterior body 4 to which a thermocompression bonding treatment is not applied is non-welded portion 24. Non-welded portion 24 is disposed to connect each container 12 and the outside of film exterior body 4. In the present exemplary embodiment, non-welded portion 24 is provided to connect a side from which first electrode lead 8 projects among four sides of each container 12 and the outside of film exterior body 4. The remaining three sides of each container 12 are surrounded by welded portion 22. An interface between film exterior body 4 and second electrode lead 10 is sealed with the sealant.

Figure 4A:
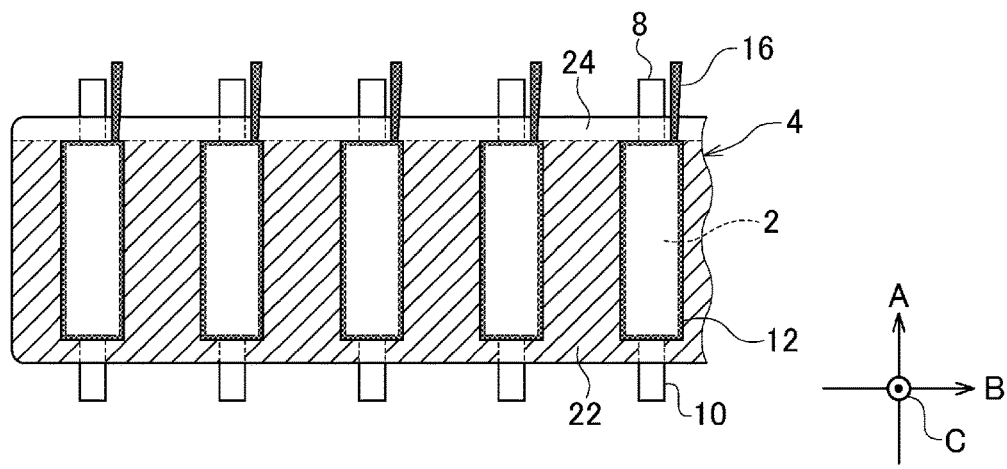
FIG. 4A to FIG. 4C are step diagrams of the method for manufacturing the electric power storage device.
Figure 4B:
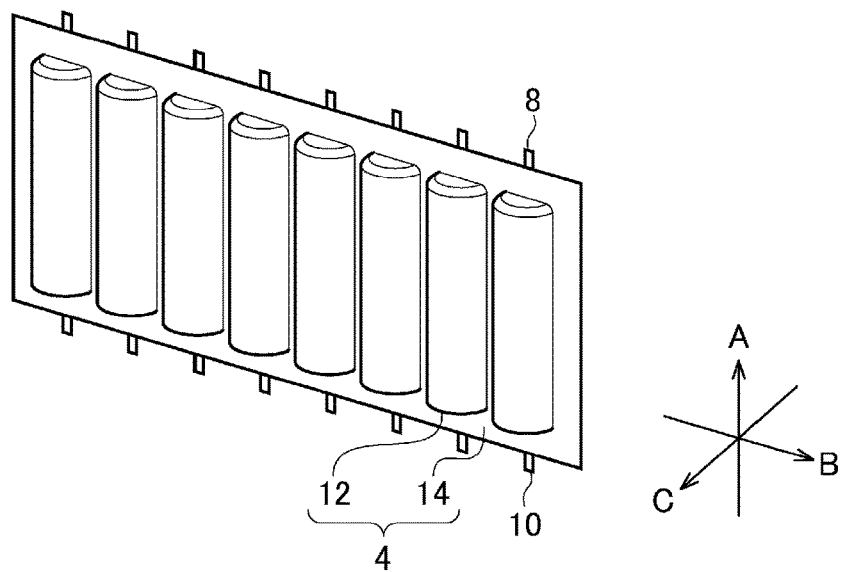
Figure 4C:
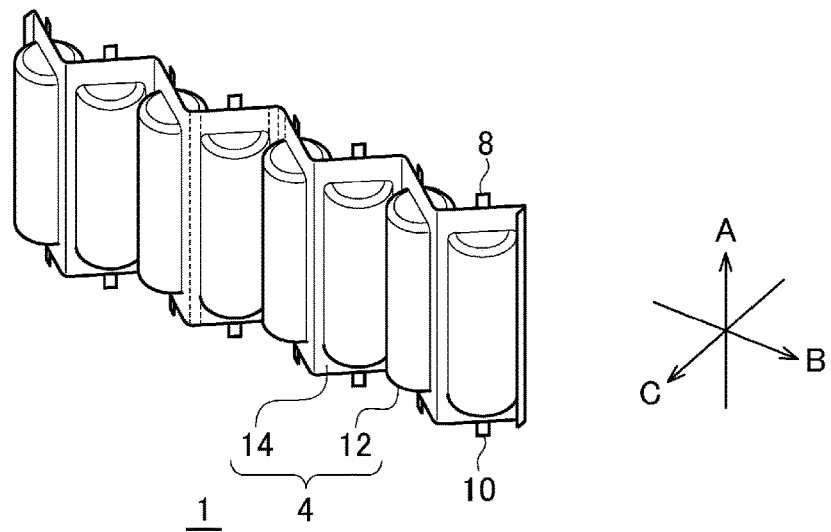

Subsequently, as illustrated in FIG. 4A, electrolytic solution 16 is injected into each container 12 via non-welded portion 24. After the injection of electrolytic solution 16, as illustrated in FIG. 4B, a thermocompression bonding treatment is applied to non-welded portion 24. As a result, sealing part 14 surrounding the entire periphery of each container 12 is formed. An interface between film exterior body 4 and first electrode lead 8 is sealed with the sealant. Subsequently, as illustrated in FIG. 4C, film exterior body 4 is bent in a zigzag manner. Through the above steps, electric power storage device 1 is obtained.

The method for manufacturing electric power storage device 1 is not limited to the method described above. For example, each electrode assembly 2 may be wrapped by using one laminate film having a length twice as long as the length of electric power storage device 1 and folding the laminate film in half. When a required amount of electrolytic solution 16 is small, the step of injecting electrolytic solution 16 illustrated in FIG. 4A can be omitted by infiltrating the inter-electrode separator with electrolytic solution 16 in advance. In this case, in the thermocompression bonding step illustrated in FIG. 3C, a thermocompression bonding treatment is applied to the entire periphery of each container 12 to form sealing part 14.

Figure 5:
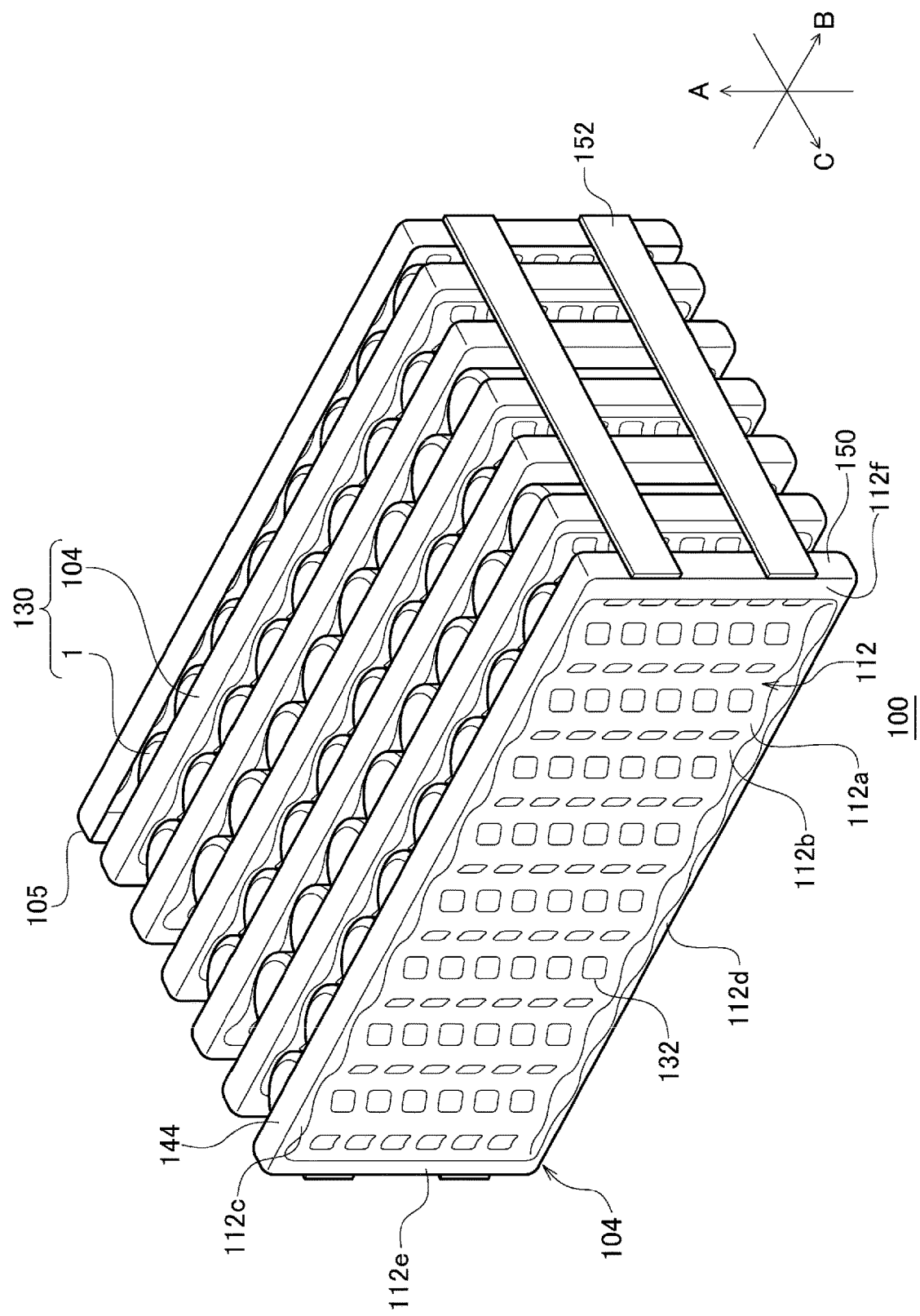
FIG. 5 is a perspective view of the electric power storage module according to the exemplary embodiment.
Figure 6:
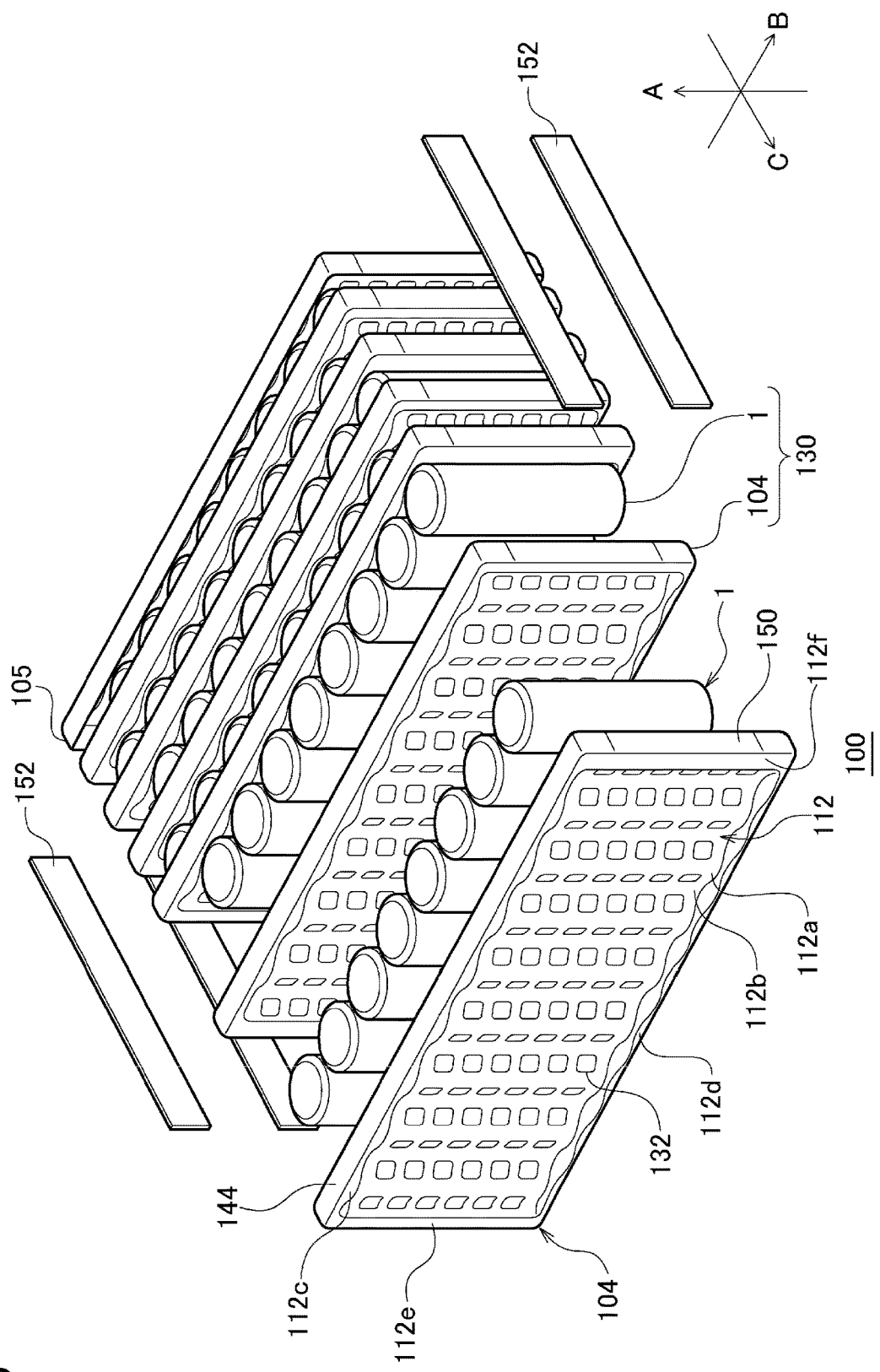
FIG. 6 is an exploded perspective view of the electric power storage module.
Figure 7A:
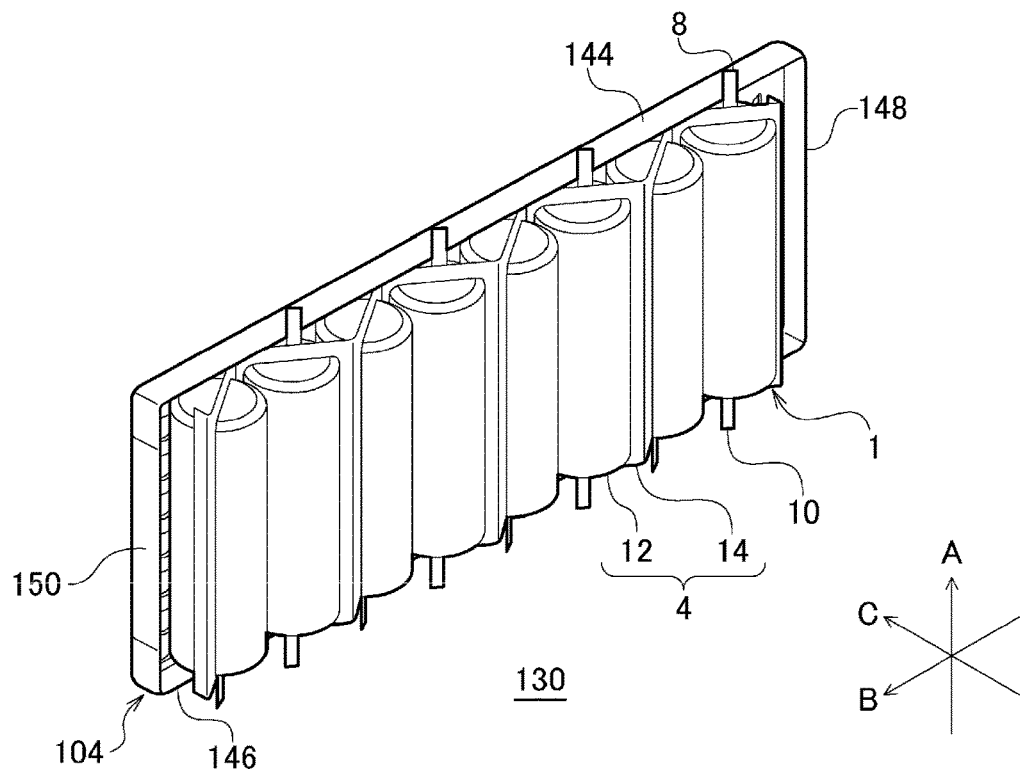
FIG. 7A and FIG. 7B are perspective views of a device unit constituting the electric power storage module.
Figure 7B:
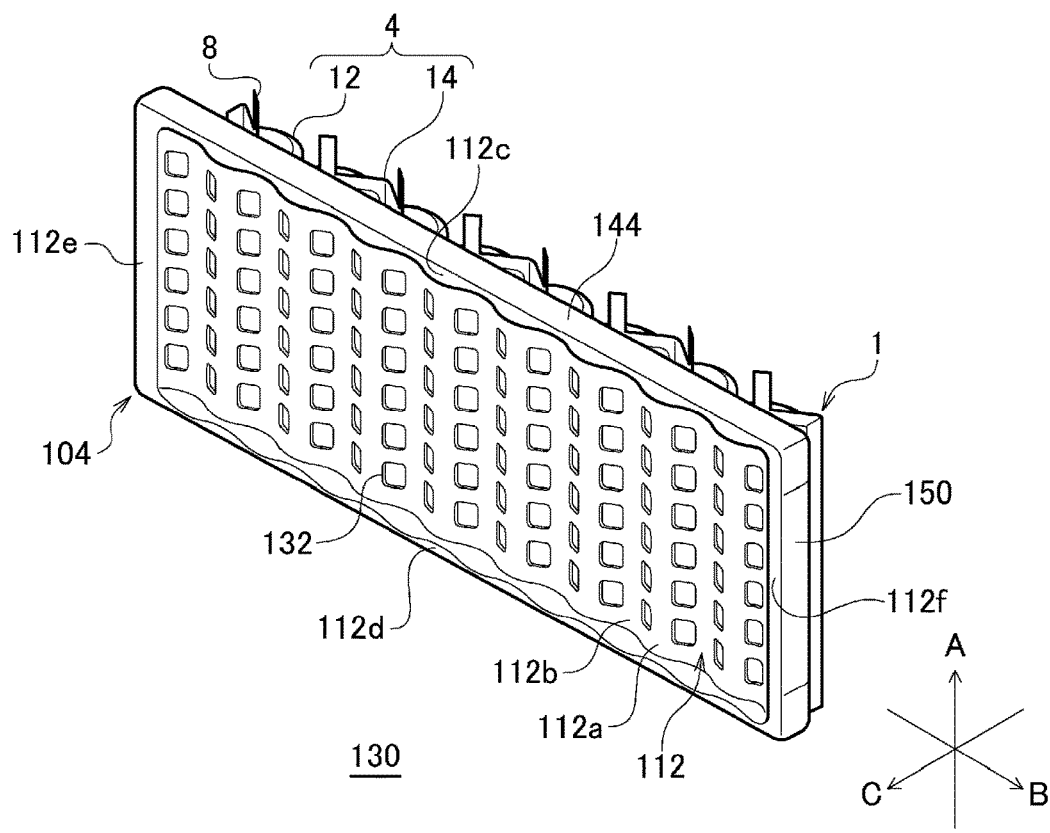
Figure 8A:
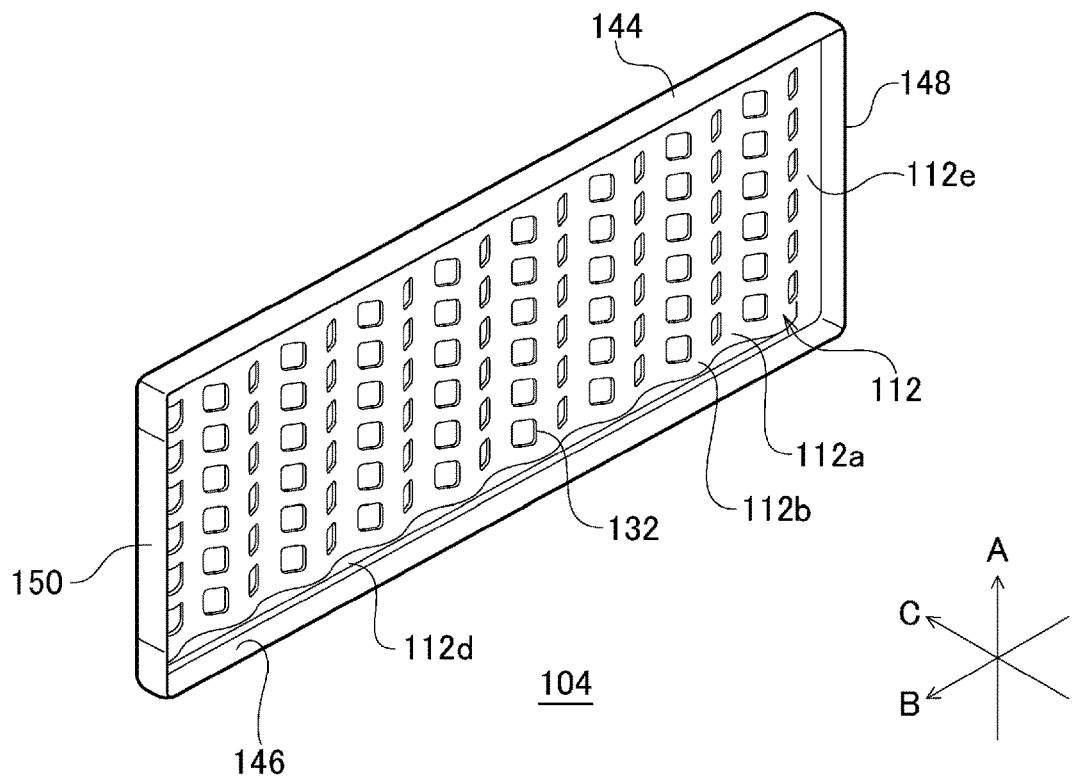
FIG. 8A and FIG. 8B are perspective views of a holder.
Figure 8B:
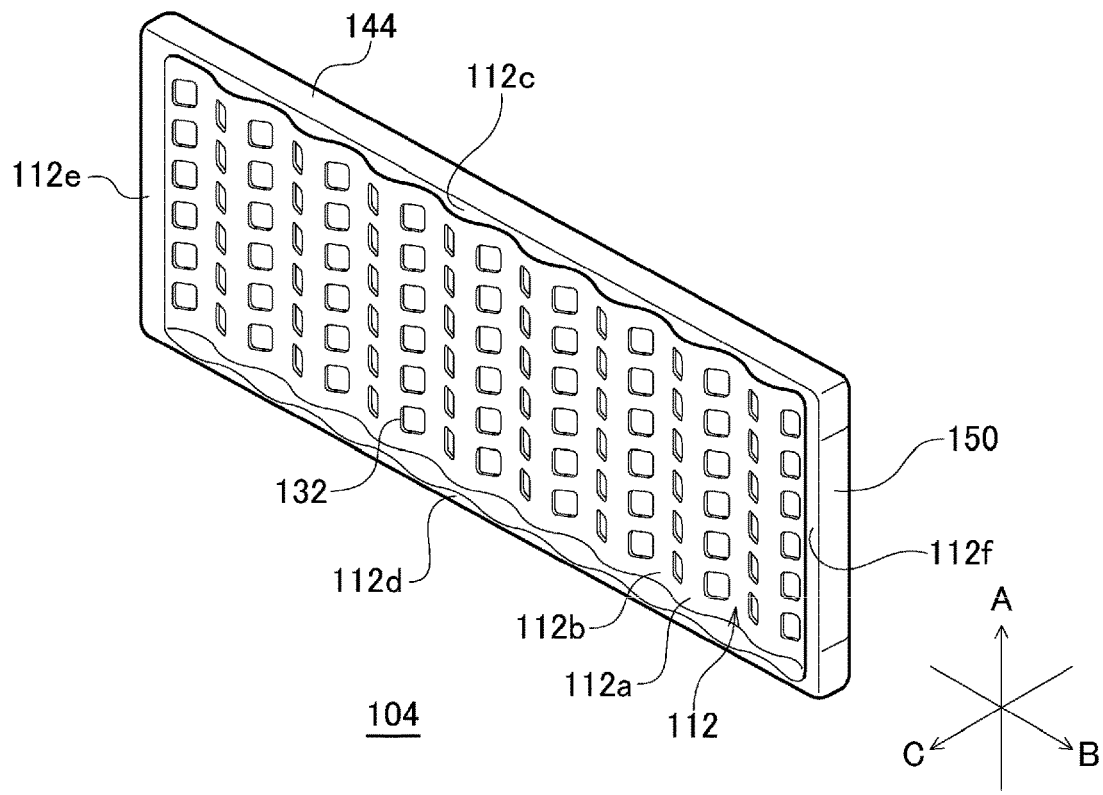
Figure 9:
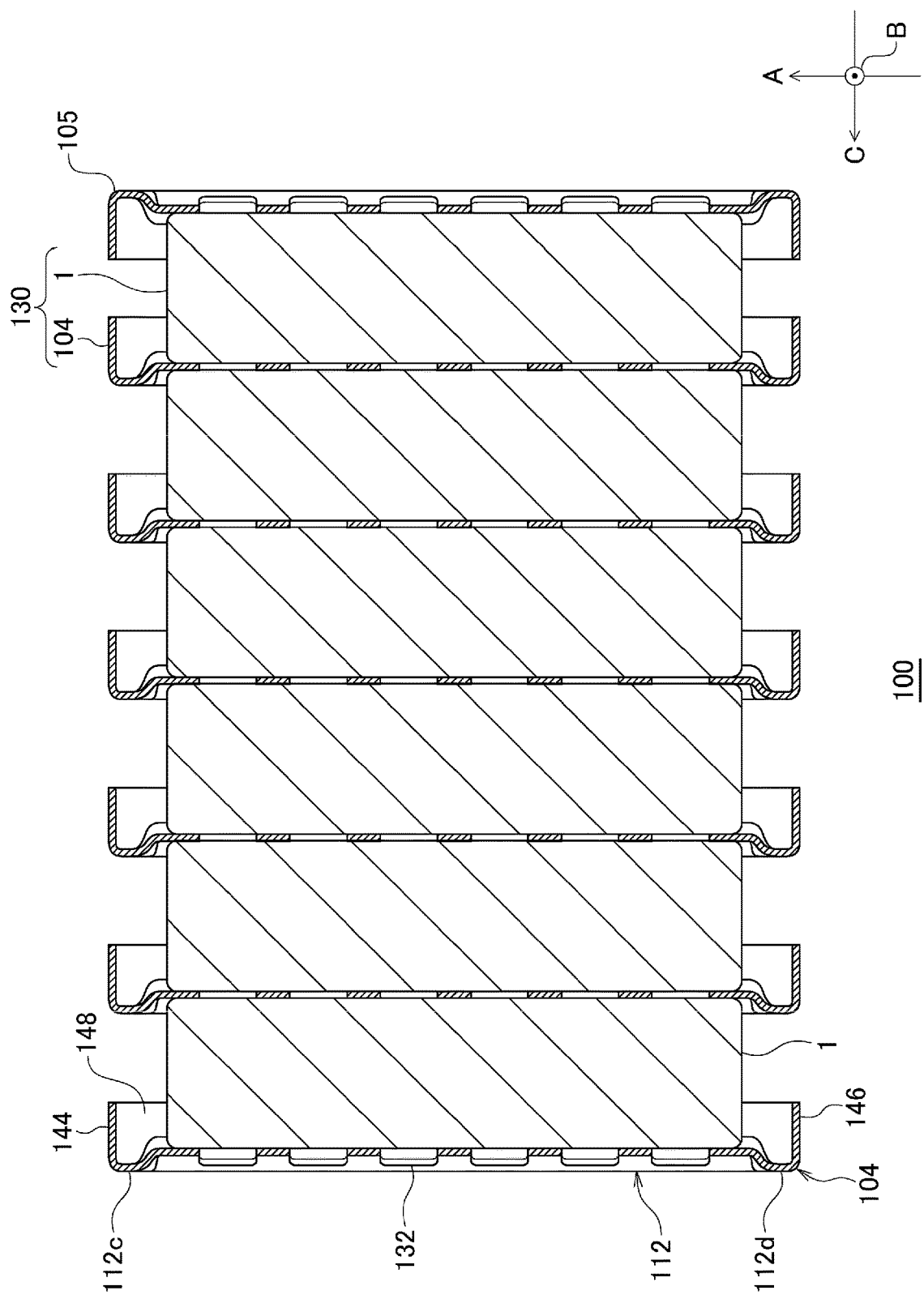
FIG. 9 is a cross-sectional view of the electric power storage module.

Electric power storage device 1 is incorporated in electric power storage module 100 according to the present exemplary embodiment to be described below. FIG. 5 is a perspective view of electric power storage module 100 according to the exemplary embodiment. FIG. 6 is an exploded perspective view of electric power storage module 100. FIG. 7A and FIG. 7B are perspective views of device unit 130 constituting electric power storage module 100. FIG. 8A and FIG. 8B are perspective views of holder 104. FIG. 9 is a cross-sectional view of electric power storage module 100. In FIG. 5, FIG. 6 and FIG. 9, illustration of electric power storage device 1 is simplified, and only container 12 is illustrated. In FIG. 9, illustration of an inside of container 12 is omitted.

Electric power storage module 100 includes electric power storage device 1 and holder 104. Electric power storage module 100 of the present exemplary embodiment includes a plurality of electric power storage devices 1 and a plurality of holders 104. As an example, one electric power storage device 1 and one holder 104 are combined to constitute one device unit 130, and six device units 130 constitute electric power storage module 100. The number of device units 130 constituting electric power storage module 100 is not particularly limited, and may be one or three or more. In device unit 130, a plurality of electric power storage devices 1 may be assembled to one holder 104.

Device units 130 are arranged in orthogonal direction C. An orientation of each device unit 130 is determined such that containers 12 of electric power storage device 1 are arranged in the same direction. Two adjacent electric power storage devices 1 in orthogonal direction C are disposed to be shifted from each other in arrangement direction B such that an axis of electrode assembly 2 of another electric power storage device 1 is positioned between axes of two adjacent electrode assemblies 2 in one electric power storage device 1. That is, container 12 of another electric power storage device 1 is fitted between valleys of two containers 12 of one electric power storage device 1. Accordingly, a dimension of electric power storage module 100 in orthogonal direction C can be reduced.

In each device unit 130, electric power storage device 1 is held by holder 104. Holder 104 of the present exemplary embodiment includes side plate 112, first wall plate 144, second wall plate 146, third wall plate 148, and fourth wall plate 150.

Side plate 112 is a plate extending in arrangement direction B. Side plate 112 includes a plurality of recesses 112a arranged in arrangement direction B. Each recess 112a has a groove shape extending in axial direction A. In a state where holder 104 has been assembled to electric power storage device 1, each container 12 of electric power storage device 1 facing side plate 112 is fitted into each recess 112a. As a result, curved surfaces of the plurality of recesses 112a extend along a curved surface of each container 12. Accordingly, electric power storage device 1 can be more stably held. In particular, displacement of electric power storage device 1 in arrangement direction B can be regulated. Recess 112a may accommodate at least a part of the curved surface of container 12 facing recess 112a.

In addition, side plate 112 of the present exemplary embodiment has at least a portion that is corrugated plate-shaped with repeated concavities and convexities in arrangement direction B, and the plurality of recesses 112a are provided at the corrugated plate-shaped portion. That is, as viewed from one main surface side, the plurality of recesses 112a and a plurality of protrusions 112b are alternately arranged in arrangement direction B. In the present exemplary embodiment, in each device unit 130, as viewed from one main surface facing electric power storage device 1, a portion curved in a direction away from electric power storage device 1 is defined as recess 112a, and a portion curved in a direction approaching electric power storage device 1 is defined as protrusion 112b.

Thus, containers 12 of electric power storage devices 1 arranged on both sides with side plate 112 interposed therebetween can be fitted into side plate 112. Specifically, for recesses 112a and protrusions 112b when side plate 112 is viewed from the one main surface side, containers 12 of one electric power storage device 1 are fitted into recesses 112a. Containers 12 of another electric power storage device 1 are fitted to protrusions 112b (which are recesses as viewed from an opposite side) from a back surface side. Accordingly, a stability of each electric power storage device 1 in electric power storage module 100 can be further enhanced. Side plate 112 may be a plate having a thickness larger than a thickness of the corrugated plate and provided with a plurality of recesses arranged in arrangement direction B on both surfaces.

Side plate 112 has a rectangular shape as viewed in orthogonal direction C, and includes first edge 112c, second edge 112d, third edge 112e, and fourth edge 112f. First edge 112c and second edge 112d are arranged in axial direction A and extend in arrangement direction B. In the present exemplary embodiment, for convenience, first edge 112c is disposed on an upper side and second edge 112d is disposed on a lower side, but first edge 112c may be disposed on the lower side and second edge 112d may be disposed on the upper side. Third edge 112e and fourth edge 112f are arranged in arrangement direction B and extend in axial direction A.

First wall plate 144 protrudes in orthogonal direction C from at least a part of a region of first edge 112c. Second wall plate 146 protrudes in orthogonal direction C from at least a part of a region of second edge 112d. Third wall plate 148 protrudes in orthogonal direction C from at least a part of a region of third edge 112e. Fourth wall plate 150 protrudes in orthogonal direction C from at least a part of fourth edge 112f. In the present disclosure, "protrudes in orthogonal direction C" means that one end of the wall plate near side plate 112 and the other end facing the one end are shifted in orthogonal direction C.

As illustrated, first edge 112c includes a flat plate-like portion extending in arrangement direction B. First wall plate 144 is bent from one end of the flat plate-like portion in axial direction A and protrudes. Second edge 112d includes a flat plate-like portion extending in arrangement direction B. Second wall plate 146 is bent from one end of the flat plate-like portion in axial direction A and protrudes. Third edge 112e includes a flat plate-like portion extending in axial direction A. Third wall plate 148 is bent from one end of the flat plate-like portion in arrangement direction B and protrudes. Fourth edge 112f includes a flat plate-like portion extending in axial direction A. Fourth wall plate 150 is bent from one end of the flat plate-like portion in arrangement direction B and protrudes. As illustrated in FIG. 9, in a case where first wall plate 144 and second wall plate 146 protrude in orthogonal direction C from the respective edges toward one side, it is preferable that the flat plate-like portion is disposed to be close to the other end side (side opposite to the protrusion direction of each wall plate) in the extending range of holder 104 in orthogonal direction C. With this configuration, dimensions of first wall plate 144 and second wall plate 146 in orthogonal direction C can be increased, and rigidity of side plate 112 can be further enhanced.

In the present exemplary embodiment, first wall plate 144 to fourth wall plate 150 protrude to the same side in orthogonal direction C. However, it is not limited to this configuration, and any two wall plates may protrude in opposite directions within a technical scope of implementation. In addition, first wall plate 144 and second wall plate 146 as an example have a shape longer in arrangement direction B than a shape in orthogonal direction C. Third wall plate 148 and fourth wall plate 150 as the example have a shape longer in axial direction A than a shape in orthogonal direction C.

Third wall plate 148 is connected to first wall plate 144 and second wall plate 146. Similarly, fourth wall plate 150 is also connected to first wall plate 144 and second wall plate 146. In the present exemplary embodiment, first wall plate 144 protrudes from an entire region of first edge 112c. Second wall plate 146 protrudes from an entire region of second edge 112d. Third wall plate 148 protrudes from an entire region of third edge 112e. Fourth wall plate 150 protrudes from an entire region of fourth edge 112f. Therefore, side plate 112 is surrounded on all sides by first wall plate 144, second wall plate 146, third wall plate 148, and fourth wall plate 150. That is, holder 104 has a tray shape in which side plate 112 is a bottom plate and first wall plate 144 to fourth wall plate 150 are annular edge walls rising from a peripheral edge of the bottom plate. First wall plate 144 and second wall plate 146 may be connected to only one of third wall plate 148 and fourth wall plate 150. All of first wall plate 144 to fourth wall plate 150 may not be connected to other wall plates. That is, each of the wall plates may protrude independently.

First wall plate 144, second wall plate 146, third wall plate 148, and fourth wall plate 150 are formed by a part of a member forming side plate 112. In the present disclosure, "formed by a part of a member forming side plate 112" means that instead of side panel 112 and respective wall plates that are originally separate bodies being integrated into a single member as a result of being fixed to each other by welding, gluing, or other known fixing methods, side panel 112 and the respective wall plates are formed into a single member by applying press working, injection molding, or other known forming processes to the single member. That is, a part of the member forming side plate 112 extends from each edge in orthogonal direction C to form each wall plate.

Holder 104 is formed by, for example, pressing one metal plate. Holder 104 may be made of a resin as long as predetermined or higher rigidity is obtained. In this case, holder 104 is formed by, for example, resin injection molding. Examples of the metal used for holder 104 include aluminum, an aluminum alloy, and steel. Examples of the resin used for holder 104 include thermoplastic resins such as polypropylene (PP), polybutylene terephthalate (PBT), polycarbonate (PC), and Noryl (registered trademark) resin (modified PPE); fiber-reinforced plastics (FRP) including carbon fiber-reinforced plastics (CFRP), glass fiber-reinforced plastics (GFRP), and the like.

An orientation of holder 104 is determined such that a main surface of side plate 112 faces orthogonal direction C. In a state where electric power storage device 1 is assembled to holder 104, one main surface in orthogonal direction C is covered with side plate 112. As an example, side plate 112 is fixed to facing electric power storage device 1 by an adhesive placed in recess 112a. The adhesive is preferably an adhesive having an insulating property. An insulating sheet may be interposed between electric power storage device 1 and holder 104.

As viewed in axial direction A, a part of electric power storage device 1 is covered with first wall plate 144 and second wall plate 146. Protrusion heights of first wall plate 144 and second wall plate 146 in orthogonal direction C are adjusted so as not to interfere with first electrode lead 8 and second electrode lead 10. As viewed in arrangement direction B, a part of electric power storage device 1 is covered with third wall plate 148 and fourth wall plate 150. In the present exemplary embodiment, protrusion heights of third wall plate 148 and fourth wall plate 150 are flush with the protrusion heights of first wall plate 144 and second wall plate 146. The protrusion heights of each wall plate may be not flush.

Electric power storage devices 1 are arranged in orthogonal direction C in a state where holder 104 has been assembled. That is, the plurality of device units 130 are arranged in orthogonal direction C. At this time, electric power storage devices 1 are disposed such that exposed surfaces that are not covered with holder 104 face the same direction. In a state where device units 130 have been arranged, the exposed surfaces of electric power storage devices 1 are covered with side plate 112 of adjacent device unit 130 and are fixed by the adhesive. Accordingly, at least a part of electric power storage device 1 is sandwiched between two side plates 112. At least a part of side plate 112 is sandwiched between two electric power storage devices 1. The adhesive may be applied only to one side plate 112 out of side plates 112 disposed on both sides of electric power storage device 1.

In a state where the plurality of device units 130 have been arranged in orthogonal direction C, coupling member 152 is overlapped on third wall plate 148 and fourth wall plate 150 of each holder 104. Coupling member 152 is a strip-shaped member that extends along the entire length of the plurality of device units 130 in orthogonal direction C. A material forming coupling member 152 is the same as the material forming holder 104, for example. Then, a known joining process such as laser welding is applied to a portion where third wall plate 148 and coupling member 152 overlap and a portion where fourth wall plate 150 and coupling member 152 overlap. As a result, holders 104 are connected to each other, and the plurality of device units 130 are integrated.

In the present exemplary embodiment, two strip-shaped coupling members 152 are arranged on each side of electric power storage module 100 in arrangement direction B, but the shape, arrangement, and the like of coupling members 152 are not limited thereto. The method for coupling device units 130 is not limited to the method of using coupling member 152. For example, third wall plate 148 and fourth wall plate 150 may protrude to a position overlapping third wall plate 148 and fourth wall plate 150 of adjacent device unit 130, and the joining process may be applied to a portion where two third wall plates 148 overlap each other and a portion where two fourth wall plates 150 overlap each other.

Device unit 130 positioned at one end in orthogonal direction C has no other device unit 130 on an exposed surface side. Thus, end holder 105 is assembled to the exposed surface of electric power storage device 1 in device unit 130. End holder 105 has the same shape as holder 104 except that a protrusion direction of each wall plate is opposite to that of holder 104. Since the protrusion height of each wall plate of holder 104 of the present exemplary embodiment is adjusted to a height that does not interfere with adjacent holder 104, and the front and back of side plate 112 have the same shape, holder 104 can be used as end holder 105 simply by changing the orientation of holder 104. Instead of end holder 105, holder 104 having the same shape and orientation as holder 104 included in each device unit 130 may be used.

Side plate 112 of the present exemplary embodiment is provided with a plurality of through-holes 132. The plurality of through-holes 132 penetrate side plate 112 in a plate thickness direction of side plate 112. The plurality of through-holes 132 are arranged in a matrix. A weight of electric power storage module 100 can be reduced by providing through-holes 132.

An insulating plate (not illustrated) may be mounted on first wall plate 144 or second wall plate 146. The insulating plate functions as, for example, a support member of a bus bar (not illustrated). The insulating plate is made of, for example, a resin having an insulating property. Examples of the resin forming the insulating plate include thermoplastic resins such as polypropylene (PP), polybutylene terephthalate (PBT), polycarbonate (PC), and Noryl (registered trademark) resin (modified PPE); fiber-reinforced plastics (FRP) including carbon fiber-reinforced plastics (CFRP), glass fiber-reinforced plastics (GFRP), and the like.

In a state where the plurality of device units 130 have been arranged in orthogonal direction C and connected to each other, the insulating plate is mounted on at least a part of first wall plate 144 and second wall plate 146, and a bus bar is mounted. First electrode lead 8 and second electrode lead 10 of each electric power storage device 1 are electrically connected to the bus bar. Accordingly, the plurality of electrode assemblies 2 are electrically connected to each other. For example, each electrode lead is joined to the bus bar by a known joining treatment such as laser welding. By interposing the insulating plate between electric power storage device 1 and the bus bar, it is possible to suppress electrical connection between each electric power storage device 1 and the bus bar at a part other than the electrode leads.

In the present exemplary embodiment, in each electric power storage device 1, the plurality of first electrode leads 8 protrude toward the same side. Orientations of two adjacent electric power storage devices 1 are determined such that first electrode leads 8 protrudes toward the same side. Thus, when the electrode leads are joined to the bus bar, all electrode assemblies 2 are connected in parallel to each other. An aspect of electrical connection between electrode assemblies 2 is not particularly limited. For example, in each electric power storage device 1, first electrode lead 8 and second electrode lead 10 may be alternately arranged, and first electrode lead 8 and second electrode lead 10 adjacent to each other may be electrically connected. That is, in each electric power storage device 1, the plurality of electrode assemblies 2 may be connected in series. Two adjacent electric power storage devices 1 may be connected in series. All electrode assemblies 2 mounted on electric power storage module 100 may be connected in series.

First electrode lead 8 and second electrode lead 10 may protrude toward the same side in axial direction A. Accordingly, electrode assemblies 2 can be electrically connected to each other only by disposing the bus bars on one side of electric power storage module 100. Therefore, man-hours for assembling electric power storage module 100 can be reduced.

As described above, electric power storage module 100 according to the present exemplary embodiment includes electric power storage device 1 and holder 104 that holds electric power storage device 1. Electric power storage device 1 includes the plurality of electrode assemblies 2 that have a cylindrical shape, and film exterior body 4 that includes the plurality of containers 12 that individually wrap the plurality of electrode assemblies 2 and sealing part 14 that seals containers 12 and connects the plurality of containers 12 to each other. Holder 104 includes side plate 112 extending in arrangement direction A of the plurality of electrode assemblies 2. Side plate 112 includes the plurality of recesses 112a arranged in arrangement direction B and into which containers 12 are fitted, first edge 112c and second edge 112d arranged in axial direction A and extending in arrangement direction B, and third edge 112e and fourth edge 112f arranged in arrangement direction B and extending in axial direction A. In addition, holder 104 includes first wall plate 144 formed by a part of the member forming side plate 112 and protruding in orthogonal direction C from at least a part of a region of first edge 112c.

Electric power storage device 1 is long in arrangement direction B, and film exterior body 4 has high flexibility. Thus, when electric power storage device 1 receives an impact or the like from the outside, electric power storage device 1 is likely to flex such that a center in arrangement direction B protrudes in orthogonal direction C with respect to both ends. Since electric power storage device 1 is long in arrangement direction B, side plate 112 is also long in arrangement direction B. From the viewpoint of the weight reduction of electric power storage module 100 and the like, the thickness of side plate 112 is required to be as thin as possible. Therefore, similarly to electric power storage device 1, side plate 112 is also likely to flex such that a center in arrangement direction B protrudes in orthogonal direction C. In particular, side plate 112 has the plurality of recesses 112a arranged in arrangement direction B, and thus is more likely to flex.

On the other hand, holder 104 of the present exemplary embodiment includes first wall plate 144 protruding in orthogonal direction C from first edge 112c of side plate 112. This increases the rigidity of holder 104 against the flexure described above. Therefore, a holding strength of electric power storage device 1 can be enhanced. Stress generated in holder 104 can be effectively reduced, and rigidity of electric power storage module 100 can be enhanced.

It is possible to suppress an increase in weight of electric power storage module 100 as compared with a case where the thickness of side plate 112 is increased to obtain the same rigidity. Therefore, it is possible to easily achieve both increased rigidity and reduced weight of electric power storage module 100. First wall plate 144 is integrally formed with side plate 112. This can increase a reliability of a connected portion between side plate 112 and first wall plate 144, as compared with a case where a separate member for reinforcing holder 104 is bonded to holder 104.

Side plate 112 of the present exemplary embodiment includes the plurality of recesses 112a, and each container 12 is fitted into each recess 112a. Accordingly, electric power storage device 1 can be more stably held. Accordingly, the electrical connection state between each electric power storage device 1 and the bus bar can be more stably held, and the breakage and the like of each electric power storage device 1 can be further suppressed. Therefore, power generation performance and safety performance of electric power storage module 100 can be enhanced. Since a pouch structure in which the plurality of electrode assemblies 2 are sealed with film exterior body 4 is adopted, the weight of electric power storage module 100 can be reduced as compared with a case where electrode assemblies 2 are individually sealed with an outer covering can.

In addition, holder 104 of the present exemplary embodiment includes second wall plate 146 formed by a part of the member forming side plate 112 and protruding in orthogonal direction C from at least a part of a region of second edge 112d. This can further enhance the rigidity of holder 104.

In addition, holder 104 of the present exemplary embodiment includes third wall plate 148 formed by a part of the member forming side plate 112, protruding in orthogonal direction C from at least a part of a region of third edge 112e, and connected to first wall plate 144. This can further enhance the rigidity of holder 104. Third wall plate 148 of the present exemplary embodiment is connected not only to first wall plate 144 but also to second wall plate 146. This can further enhance the rigidity of holder 104. Third wall plate 148 may be connected to at least one of first wall plate 144 and second wall plate 146. In a case where third wall plate 148 is connected to both first wall plate 144 and second wall plate 146, a further rigidity improvement effect can be obtained, but in a case where third wall plate 148 is connected to at least one of first wall plate 144 and second wall plate 146, a considerable rigidity improvement effect can be obtained.

In addition, holder 104 of the present exemplary embodiment includes fourth wall plate 150 formed by a part of the member forming side plate 112, protruding in orthogonal direction C from at least a part of a region of fourth edge 112f, and connected to first wall plate 144. This can further enhance the rigidity of holder 104. Fourth wall plate 150 of the present exemplary embodiment is connected not only to first wall plate 144 but also to second wall plate 146. This can further enhance the rigidity of holder 104. Fourth wall plate 150 may be connected to at least one of first wall plate 144 and second wall plate 146. In a case where fourth wall plate 150 is connected to both first wall plate 144 and second wall plate 146, a further rigidity improvement effect can be obtained, but in a case where fourth wall plate 150 is connected to at least one of first wall plate 144 and second wall plate 146, a considerable rigidity improvement effect can be obtained.

Holder 104 of the present exemplary embodiment includes first wall plate 144 protruding in orthogonal direction C from first edge 112c, second wall plate 146 protruding in orthogonal direction C from second edge 112d, third wall plate 148 protruding in orthogonal direction C from third edge 112e, and fourth wall plate 150 protruding in orthogonal direction C from fourth edge 112f. First wall plate 144, second wall plate 146, third wall plate 148, and fourth wall plate 150 are formed by a part of the member forming side plate 112. Side plate 112 is surrounded on all sides by first wall plate 144, second wall plate 146, third wall plate 148, and fourth wall plate 150. This can further enhance the rigidity of holder 104.

Electric power storage module 100 of the present exemplary embodiment includes the plurality of electric power storage devices 1. Side plate 112 has at least a portion that is corrugated plate-shaped with repeated concavities and convexities in arrangement direction B, the plurality of recesses 112a are provided at the corrugated plate-shaped portion and are sandwiched between two electric power storage devices 1, each container 12 of one electric power storage device 1 is fitted into each recess 112a as viewed from one main surface, and each container 12 of another electric power storage device 1 is fitted into each protrusion 112b from a back surface as viewed from the main surface side. Accordingly, the stability of each electric power storage device 1 in electric power storage module 100 can be further enhanced. When a part of side plate 112 is formed in a corrugated plate shape, a volume of a portion forming recess 112a of side plate 112 can be reduced. Thus, the weight of holder 104 can be reduced. The plurality of recesses 112a can be formed by pressing a metal plate or other raw material.

First edge 112c of the present exemplary embodiment has a flat plate-like portion extending in arrangement direction B. First wall plate 144 is bent from one end of the flat plate-like portion in axial direction A and protrudes. This configuration enables holder 104 to be manufactured easily as compared with a case when no flat plate-like portion of first edge 112c is between the plurality of recesses 112a and first wall plate 144, that is, when first wall plate 144 is formed directly on an end of the corrugated plate. In particular, holder 104 can be manufactured more easily when holder 104 is manufactured by bending a metal plate through press working or other means. Therefore, the reliability and yield of manufacturing holder 104 can be improved.

Second edge 112d of the present exemplary embodiment has a flat plate-like portion extending in arrangement direction B. Second wall plate 146 is bent from one end of the flat plate-like portion in axial direction A and protrudes. For the same reason as a case where first edge 112c has the flat plate-like portion, this configuration enables holder 104 to be manufactured easily and improves the reliability and yield of manufacturing the holder 104.

Film exterior body 4 of the present exemplary embodiment is refracted or curved between adjacent containers 12 and meanders in arrangement direction B. This allows the length of electric power storage device 1 to be shorter than when film exterior body 4 is not folded, without reducing the dimension of sealing part 14. As a result, the number of electrode assemblies 2 mounted on electric power storage module 100 can be increased, and electric power storage module 100 can be downsized without reducing the number of electrode assemblies 2 mounted on the electric power storage module. That is, according to the present exemplary embodiment, it is possible to improve energy density of electric power storage module 100 while suppressing decrease in sealing property of electrode assembly 2.

First wall plate 144 and second wall plate 146 may protrude to both sides in orthogonal direction C from each edge of side plate 112. Such a structure also includes a structure in which each wall plate protrudes from each edge to one side in orthogonal direction C, and then is folded back to protrude to the other side in orthogonal direction C. Extending ranges of first wall plate 144 and second wall plate 146 in orthogonal direction C are limited to a range sandwiched between the electrode leads of two electric power storage devices 1 arranged with side plate 112 interposed therebetween. On the other hand, the larger the dimension of each wall plate in orthogonal direction C, the more flexure of side plate 112 described above can be suppressed. Therefore, by protruding first wall plate 144 and second wall plate 146 to both sides in orthogonal direction C, the dimensions of first wall plate 144 and second wall plate 146 in orthogonal direction C can be increased as compared with a case of protruding only to one side. Thus, the flexure of side plate 112 can be more easily suppressed.

Extending ranges of third wall plate 148 and fourth wall plate 150 are not limited by the electrode leads of electric power storage device 1, but similarly to first wall plate 144 and second wall plate 146, third wall plate 148 and fourth wall plate 150 preferably protrude to both sides in orthogonal direction C. This increases the connected area (cross-sectional area) with first wall plate 144 and second wall plate 146 and enhances the rigidity of holder 104.

The exemplary embodiments of the present disclosure have been described in detail above. The above-described exemplary embodiment is merely a specific example for implementing the present disclosure. The contents of the exemplary embodiment do not limit the technical scope of the present disclosure, and many design changes such as changes, additions, and deletions of constituent elements can be made without departing from the spirit of the invention defined in the claims. Any new exemplary embodiment resulting from a change or modification according to the designed concept offers effects of an exemplary embodiment and a modification that are combined with the new exemplary embodiment. In the above-described exemplary embodiment, what can be changed or modified according to the designed concept is emphasized by such phrases as "of the present exemplary embodiment" and "in the present exemplary embodiment". However, contents not expressed by such phrases may also be changed or modified according to the designed concept. Further, any combination of constituent elements included in each exemplary embodiment is also effective as an aspect of the present disclosure. Hatching applied to the cross section in the drawing does not limit the material of the object to which the hatching has been applied.

REFERENCE MARKS IN THE DRAWINGS 1 electric power storage device
2 electrode assembly
4 film exterior body
12 container
14 sealing part
100 electric power storage module
104 holder
112 side plate
112a recess
112b protrusion
112c first edge
112d second edge
112e third edge
112f fourth edge
144 first wall plate
146 second wall plate
148 third wall plate
150 fourth wall plate

The invention claimed is:
1. An electric power storage module comprising:
an electric power storage device; and
a holder that holds the electric power storage device, wherein
the electric power storage device includes
a plurality of electrode assemblies that include a cylindrical shape, and
a film outer covering body that includes a plurality of containers that individually wrap the plurality of electrode assemblies and a sealing part that seals the containers and connects the plurality of containers to each other,
the holder includes
a side plate that is provided in an arrangement direction of the plurality of electrode assemblies, the side plate including
a plurality of concavities arranged in the arrangement direction and into which the containers are fitted,
a first edge and a second edge each arranged along an axis of the electrode assemblies and provided in the arrangement direction, and
a third edge and a fourth edge each arranged in the arrangement direction and extending along the axis, and a first wall plate that is constituted by a part of a member constituting the side plate and protrudes in an orthogonal direction orthogonal to the axis and the arrangement direction from at least a part of a region of the first edge.

2. The electric power storage module according to claim 1, wherein
the holder includes a second wall plate that is constituted by a part of a member constituting the side plate and protrudes in the orthogonal direction from at least a part of a region of the second edge.

3. The electric power storage module according to claim 1, wherein
the holder includes a third wall plate that is constituted by a part of a member constituting the side plate, protrudes in the orthogonal direction from at least a part of a region of the third edge, and connected to the first wall plate.

4. The electric power storage module according to claim 2, wherein
the holder includes a third wall plate that is constituted by a part of a member constituting the side plate, protrudes in the orthogonal direction from at least a part of a region of the third edge, and connected to at least one of the first wall plate and the second wall plate.

5. The electric power storage module according to claim 1, wherein
the holder includes a fourth wall plate that is constituted by a part of a member constituting the side plate, protrudes in the orthogonal direction from at least a part of a region of the fourth edge, and connected to the first wall plate.

6. The electric power storage module according to claim 2, wherein
the holder includes a fourth wall plate that is constituted by a part of a member constituting the side plate, protrudes in the orthogonal direction from at least a part of a region of the fourth edge, and connected to at least one of the first wall plate and the second wall plate.

7. The electric power storage module according to claim 1, wherein
the holder includes
a first wall plate that protrudes in the orthogonal direction from the first edge,
a second wall plate that protrudes in the orthogonal direction from the second edge,
a third wall plate that protrudes in the orthogonal direction from the third edge, and
a fourth wall plate that protrudes in the orthogonal direction from the fourth edge, wherein
the first wall plate, the second wall plate, the third wall plate, and the fourth wall plate are constituted by a part of a member constituting the side plate,
the side plate is surrounded on all sides by the first wall plate, the second wall plate, the third wall plate, and the fourth wall plate.

8. The electric power storage module according to claim 1, wherein
the electric power storage module includes the plurality of the electric power storage devices,
the side plate includes at least a part that is corrugated plate-shaped with repeated the plurality of concavities and a plurality of convexities in the arrangement direction, the plurality of concavities are provided at the corrugated plate-shaped part and are sandwiched between two of the electric power storage devices,
each of the containers of one electric power storage device is fitted into a corresponding one of the concavities as viewed from one main surface, and each of the containers of another electric power storage device is fitted into a corresponding one of the convexities from a back surface side as viewed from the main surface.

9. The electric power storage module according to claim 8, wherein
the first edge includes a flat plate-like part provided in the arrangement direction, and
the first wall plate is bent from one end of the flat plate-like part along the axis and protrudes.

10. The electric power storage module according to claim 8, wherein
the holder includes the second wall plate that is constituted by a part of a member constituting the side plate and protrudes in the orthogonal direction from at least a part of a region of the second edge, wherein
the second edge includes a flat plate-like part provided in the arrangement direction, and
the second wall plate is bent from one end of the flat plate-like part along the axis and protrudes.

11. The electric power storage module according to claim 1, wherein
the film outer covering body is refracted or curved between adjacent containers among the plurality of containers and meanders in the arrangement direction.

* * * * *